United States Patent [19]
Yamada et al.

[11] Patent Number: 6,133,380
[45] Date of Patent: Oct. 17, 2000

[54] ANTIFOULING RESINOUS COMPOSITION AND METHOD FOR PRODUCTION THEREOF

[75] Inventors: Koji Yamada; Nobushige Numa, both of Kanagawa, Japan

[73] Assignee: Kansai Paint Co., Ltd, Japan

[21] Appl. No.: 09/022,543

[22] Filed: Feb. 12, 1998

[30] Foreign Application Priority Data

Feb. 12, 1997 [JP] Japan ..................... 9-063693

[51] Int. Cl.$^7$ .................. C08F 8/42; C08F 8/14; C08G 63/91; C08A 20/10
[52] U.S. Cl. .................. 525/330.1; 525/117; 525/330.3; 556/114; 424/78
[58] Field of Search .................. 525/330.1, 330.3, 525/117; 556/114; 424/78

[56] References Cited

U.S. PATENT DOCUMENTS

| | | | |
|---|---|---|---|
| 4,082,709 | 4/1978 | Dyckman et al. | 424/78.09 |
| 4,870,197 | 9/1989 | Gutierrez et al. | 556/114 |
| 4,880,056 | 11/1989 | Nelson et al. | 166/51 |
| 5,319,018 | 6/1994 | Owens et al. | |
| 5,374,665 | 12/1994 | Isaka et al. | 523/122 |

FOREIGN PATENT DOCUMENTS

| | | |
|---|---|---|
| 8209005 | 8/1996 | Japan . |
| 2311070 | 9/1997 | United Kingdom . |

OTHER PUBLICATIONS

Kitaoka, "Introduction to Synthetic Resin for Coating" *High Polymer Publishing Society* pp. 1–3 (1974) (English Translation).

*Primary Examiner*—David W. Wu
*Assistant Examiner*—Tanya Zalukaeva
*Attorney, Agent, or Firm*—Rader, Fishman & Grauer

[57] ABSTRACT

An antifouling resinous composition comprising as an active component thereof one or more resins represented by the formulas Formula (1)

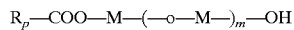

Formula (2)

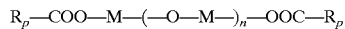

Formula (3)

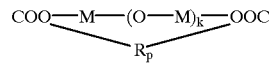

wherein $R_p$ represents a basal resin, M represents in each occurrence the same or different divalent metallic atom, m represents an integer in the range of 1–10, n represents an integer in the range of 0–10, and k represents an integer in the range of 0–10, and contains a metal carboxylate in the molecular unit.

16 Claims, 2 Drawing Sheets

ANTIFOULING RESINOUS COMPOSITION AND METHOD FOR PRODUCTION THEREOF

BACKGROUND OF THE INVENTION

1. Field of the Invention

This invention relates to an antifouling resinous composition having as an active component thereof, a resin containing a metal carboxylate in the molecular unit thereof and methods for the production of resins.

2. Description of Related Art

Prior to the present invention, resins which have a metal salt structure as a molecular unit have been studied for potential as a prospective binder for antifouling paints and have been reduced to practice. The most common of these resins are carboxylates of tin. Since carboxylates of tin have exhibited toxicity problems, carboxylates of copper or zinc have gained wider use recently. Both of these resins possess no free hydroxyl groups and are represented by the following general formula (A) or (B).

  (A)

  (B)

wherein $R_p$ represents a basal resin, M represents a divalent metallic atom, R represents a hydrocarbon group, and n represents an integer in the range of 1–3.

When a hydroxyl group is present, the resin inevitably gels in the synthesis process, thereby producing a defective antifouling resinous composition.

The synthesis of compound (A) is generally expensive. In addition, the synthesis of compound (B) is likely to produce mixtures of various compounds because two or more hydroxyl groups have only small differences in reactivity, and as a consequence, the product requires very expensive purification.

SUMMARY OF THE INVENTION

The present invention is therefore directed to:

An antifouling resinous composition comprising one or more members selected from the group consisting of resins of the following formulae:

Formula (1)

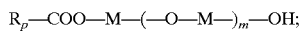

Formula (2)

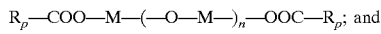

Formula (3)

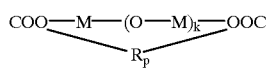

wherein $R_p$ is a basal resin, M is at each occurrence, the same or different divalent metallic atom, m is an integer in the range of 1–10, n is an integer in the range of 0–10, and k is an integer in the range of 0–10.

The present invention is also directed to methods for production of resinous compositions.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE INVENTION

Figure 1:
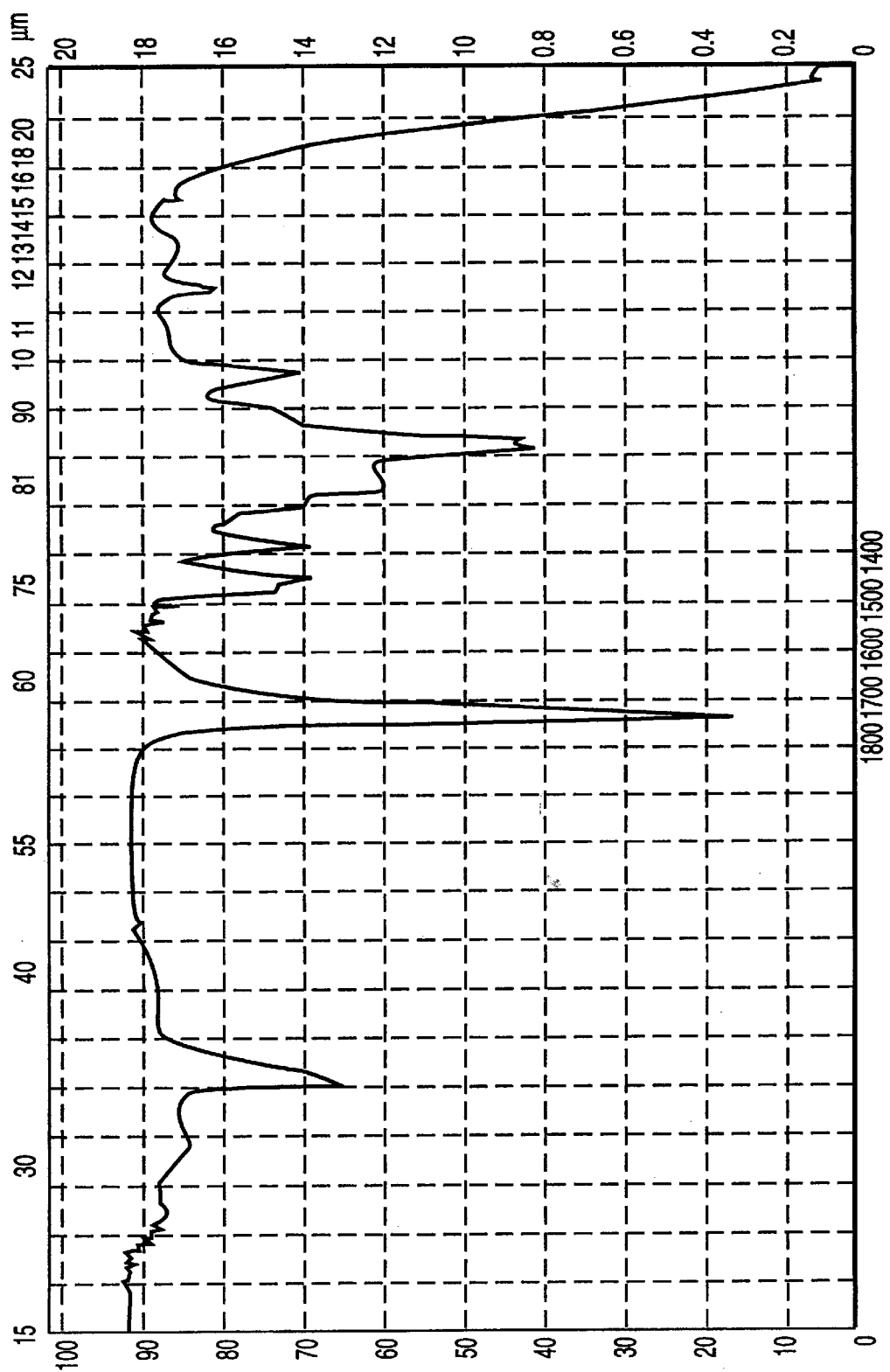
FIG. 1 is an IR spectrum prior to the reaction of zinc oxide in Example 1.

This invention further concerns a resinous composition, wherein any desired divalent metallic atom can be used. In a preferred embodiment, the divalent metallic atom is at least one member selected from the group consisting of copper, zinc, calcium, magnesium, and iron.

The invention also concerns a resinous composition, wherein the basal resin is a vinyl polymer having an acid value in the range of 30–300. A "basal resin" (sometimes also known as a base resin) is a main ingredient of a coating film and is generally an organic high polymer compound as defined, for example, in "Introduction to Synthetic Resin for Paint", published by High Polymer Publication Association, which is incorporated herein by reference.

A further concern of the invention relates to a method for the production of an antifouling resinous composition comprising as an active component, one or more members selected from the group consisting of resins of the following formulae:

Formula (1)

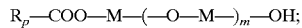

Formula (2)

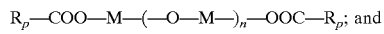

Formula (3)

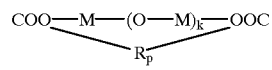

wherein $R_p$ represents a basal resin, M represents a divalent metallic atom, m represents an integer in the range of 1–10, preferably 1–5, n represents an integer in the range of 0–10, preferably 0–5, and k represents an integer in the range of 0–10, preferably 0–5 and contains a metal carboxylate in the molecular unit, characterized by causing the oxide or hydroxide of a divalent metal to react with a resin having a carboxyl group in the molecular unit (molecule) in the presence of about 6–30% by weight of water based on the weight of the resin having a carboxyl group.

M can be the same or different, and thus, the present invention envisions the use of two or more kinds of metal. The "metal carboxylate in the molecular unit thereof" refers to the —COO—M in formula (1), (2) and (3).

Yet another concern of the invention relates to a method for the production of an antifouling resinous composition, wherein the divalent metallic atom is at least one member selected from the group consisting of copper, zinc, calcium, magnesium, and iron, however, any desired divalent metal can be used.

In a further concern of the invention a method for the production of an antifouling resinous composition, wherein the basal resin is a vinyl polymer having an acid value in the range of about 30–300, preferably 50–200 is contemplated, however, any desired basal resin can be used. For example, resins can be used that have a number average molecular weight between 1,000–50,000, more preferably 3,000–20,000. The solid content in the resin is preferably 20–70% by weight, most preferably 30–60% by weight.

The present inventors, in view of the deficiencies of the prior art mentioned above, have developed an antifouling resinous composition that is generally inexpensive and possesses a metal carboxylate as well as methods for the synthesis thereof. They have consequently found that resins having the structures of the formulas (1)–(3) mentioned above can be synthesized if desired without entailing gelation. These compounds can be prepared, for example, by reacting the oxide or hydroxide of a divalent metal to react with a resin possessing a carboxyl group in the molecular unit in the presence of water. Since the metallic atom has a valency of 2, it is expected that the reaction produces a three-dimensional structure by virtue of an ion bondage. However, even when the amount of the oxide or hydroxide of a divalent metal used in the reaction is generally in the range of about 0.1–1 mole, based on one mole of the carboxyl group, the reaction does not induce gelation. While not being bound to any one theory, the inventors believe that the presence of water prevents the conversion by ion bondage into a three-dimensional structure. Any desired amount of water can be used.

The reaction proceeds very quickly when water is added to the reaction mixture in an amount in the range of about 6–30% by weight based on the solid content of the resin. After the reaction is completed, the water, which has not solved into the system, can be easily separated by any known method such as by application of heat, reduction in pressure, and decantation, for example.

Thus, the present invention provides an antifouling resinous composition having as an active component thereof one or more members selected from the group consisting of resins represented by the following formulae:

Formula (1)

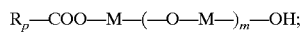

Formula (2)

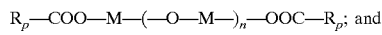

Formula (3)

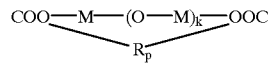

wherein $R_p$ represents a basal resin, M represents a divalent metallic atom, m represents an integer in the range of 1–10, n represents an integer in the range of 0–10, and k represents an integer in the range of 0–10 and contains a metal carboxylate in the molecular unit. The present invention also provides methods for the synthesis of resinous compositions.

In this invention, the resin of the formula (1) is preferably such that the symbol m in this formula represents an integer in the range of 1–10. If m is 0, the applied film formed from the resin may not be sufficiently abrasive when under the influence of aging, even though it can be used if so desired. If m is 11 or over, the film may be incompatible with the resinous skeleton of basal resin, even though it can be used if so desired. The integer, therefore, is preferred to be in the range of 1–10.

The resin of the formula (2) is such that the symbol n in this formula preferably represents an integer in the range of 0–10. If n is 11 or over, the resin may be incompatible with the resinous skeleton of basal resin, even though it can be used if so desired. When n is 0, the formula represents a structure, —COO—M—OOC. Since compounds of this structure display a beneficial effect, n=0 is acceptable.

The resin of the formula (3) is such that the symbol k in this formula preferably represents an integer in the range of 0–10. If k is 11 or over, the resin may be incompatible with the resinous skeleton of basal resin. When k is 0, the formula represents a structure, —COO—M—OOC. Since compounds of this structure display a beneficial effect, k=0 is acceptable.

The oxides or hydroxides of the divalent metal to be used in this invention are generally indistinguishable based on the metal species used. In terms of cost, toxicity, reactivity, etc., it is generally preferred to use an oxide or hydroxide of a metal selected from among copper, zinc, calcium, magnesium, and iron. However, any divalent metal can be used alone or in combination with another divalent metal.

Resins which possess a carboxyl group in the molecular unit suitable for use as the basal resin in the present invention may be selected from among polyesters, polyurethanes, natural resins, vinyl polymers, etc. It is preferred to use a vinyl polymer. However, it is possible to vary the polymer selected for the composition. The acid value of this resin is preferred to be in the range of about 30–300. If the acid value is less than about 30, the resin may not be sufficiently abrasive when under the influence of aging, even though it can be used if so desired. Conversely, if the acid value exceeds about 300, the resin may exhibit high viscosity and may be difficult to handle. Deviation of the acid value from the range mentioned above, may prove to be unfavorable in some circumstances.

In a method for the synthesis of the resinous composition of the present invention, a resin possessing a carboxyl group in the molecular unit is preferably combined with about 6–30% by weight of water based on the weight of the resin having a carboxyl group in its molecule, and an oxide or hydroxide of a divalent metal. The substances are preferably reacted at a temperature in the range of about 50–200° C., preferably for a period in the range of about 1–20 hours. If the system becomes turbid in the presence of water, a polar solvent may be added. Examples of a polar solvent include, alcohol type solvents such as n-butanol and isopropyl alcohol; ketone type solvents such as methylethyl ketone and methylisobutyl ketone; ester type solvents such as ethyl ester, butyl acetate, and isobutyl acetate; and ether type solvents such as cellosolve, butyl cellosolve, diethylene glycol, diethylene glycol monoethyl ether, and diethylene glycol monobutyl ether. In the beginning, the reaction mixture may not dissolve a powdery metallic compound at first; however, the system should gradually becomes transparent as the reaction proceeds.

The invention is described below by the following non-limiting examples.

EXAMPLES

Example 1

Figure 2:
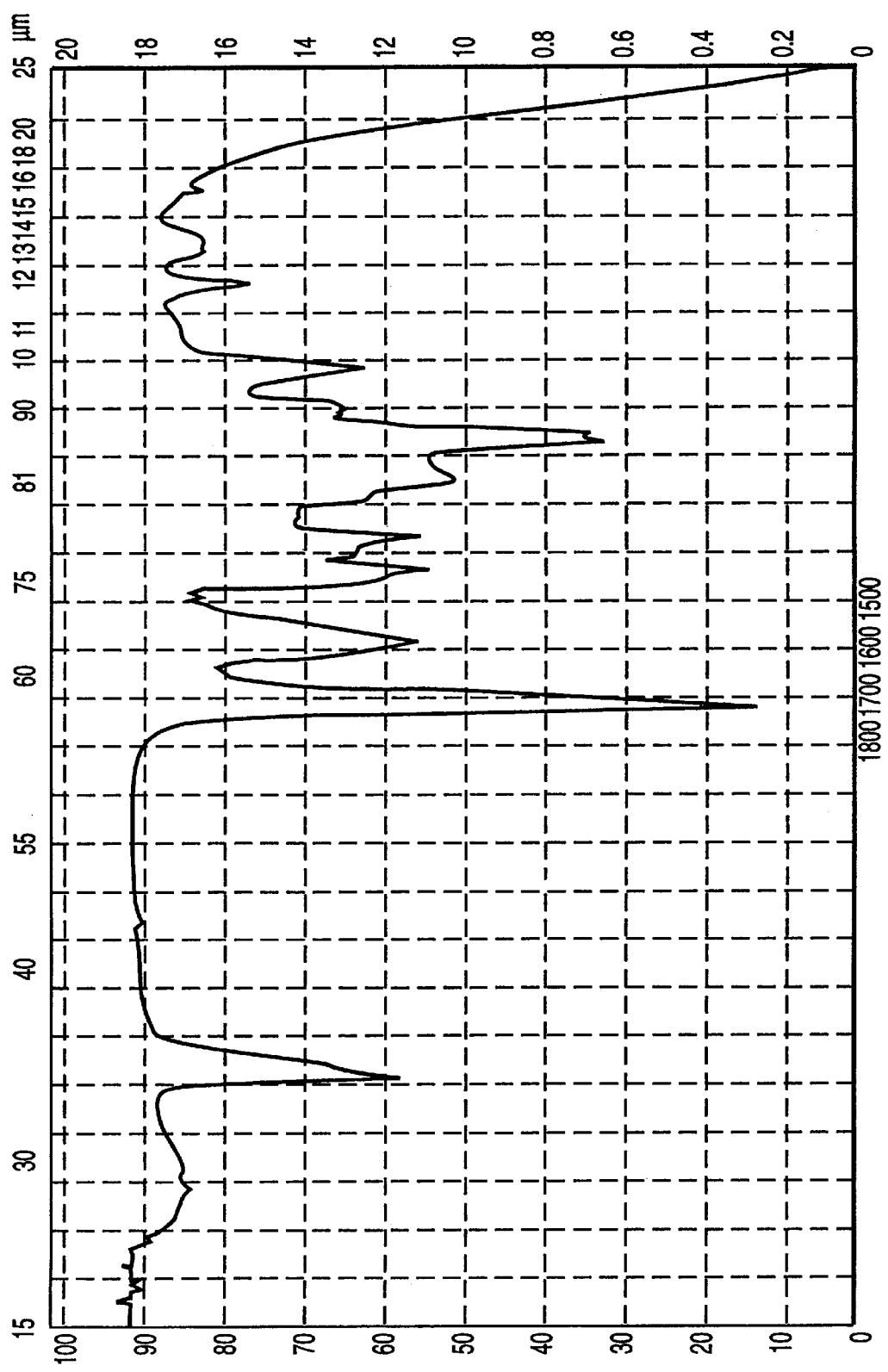
FIG. 2 is an IR spectrum subsequent to the reaction of zinc oxide in Example 1.

A transparent resin solution having a solids content of 38.8% by weight was prepared by adding 30 parts by weight of butyl acetate, 4 parts by weight of zinc oxide, and 8 parts by weight of water to 100 parts by weight of a xylene/butanol solution containing a copolymer formed of 18.4 parts by weight of methacrylic acid and 81.6 parts by weight of ethyl acrylate having a number average molecular weight of 10,000 at a solids concentration of 50% by weight and heating the mixture at 100° C. for 20 hours. FIG. 1 illustrates an IR spectrum prior to the reaction of zinc oxide and FIG. 2 illustrates an IR spectrum subsequent to the reaction of zinc oxide. It can be noted from the comparison of FIG. 1 and FIG. 2 that the IR spectrum subsequent to the reaction of zinc oxide shows a large absorption of zinc carboxylate at 1550–1630 cm$^{-1}$. By the determination of absolute molecular weight in accordance with the light scattering technique, gas chromatography, high-speed liquid chromatography, and assay of a zinc-containing component in accordance with the technique of atomic absorption analysis, the produced resin was identified as a mixture consisting of 40% of the compound of the formula (1) having an integer, m, averaging 5.5, 18% of the compound of the formula (2) having an integer, n, averaging 0.8, and 42% of the compound of the formula (3) having an integer, k, averaging 0.9.

Example 2

A polyester resin having a number average molecular weight of 4,500 and an acid value of 50 was prepared by adding phthalic anhydride to 100 g of a polyester resin comprising adipic acid/ethylene glycol/trimethylolpropane. A transparent resin solution having a solids content of 50.0% by weight was prepared by adding 100 g of cellosolve, 2.5 of magnesium hydroxide, and 12 g of water to 100 g of the polyester resin mentioned above and heating the mixture at 105° C. for 16 hours. The IR spectrum of the produced resin showed a large absorption of magnesium carboxylate at 1550–1630 cm$^{-1}$. By the determination of absolute molecular weight in accordance with the light scattering technique, gas chromatography, high-speed liquid chromatography, and assay of a magnesium-containing component in accordance with the technique of atomic absorption analysis, the produced resin was identified as a compound of the formula (3) having an integer, k, averaging 1.1.

Applied Example

The resin solutions prepared as in Examples 1 and 2 each were applied to an aluminum sheet to yield a film having a dry thickness of 120 μm. The coated aluminum sheets were dried and then set in position in the sea water of Suruga Bay at a depth of 1 m. When the sheets were pulled out of sea water after the elapse of one summer, they showed absolutely no sign of adhesion of acorn shells.

Aluminum sheets treated 120 micron layer of a resin having carboxyl groups in the molecule that had not undergone reaction with the relevant metal compounds 1 and 2 were subjected to the same test under sea water. After standing under sea water, the coated sheets were found to have lost the resin by solution and have attracted numerous acorn shells, 0.5–3 mm in diameter, to the naked skins.

The aluminum sheets not coated at all were found in the test to have attracted numerous acorn shells.

The resin to be obtained by this invention displays an excellent antifouling ability and is suitably used for antifouling paints. Suitable paints that can be prepared typically have a composition comprising a resin such as an acrylic resin, a polyester resin, an epoxy resin, and/or a polyurethane resin; a paraff such as a chlorinated paraffin, solid paraffin, liquid paraffin, and/or vacellin; and a coloring pigment, an extender, and/or an anti-stain pigment. An organic solvent, plasticizer, or a prevention agent can also be included if desired. The above ingredients can generally be mixed or otherwise combined to form a suitable paint.

Other embodiments of the invention will be apparent to those skilled in the art from consideration of the specification and practice of the invention disclosed herein. It is intended that the specification be considered as exemplary only, with the true scope and spirit of the invention being indicated by the following claims.

The Priority Document, Japanese Patent Application No. 9-63693 filed Feb. 12, 1997, as well as all documents referred to herein are expressly incorporated by reference.

As used herein and in the following claims, singular articles such as "a", "an", and "one" are intended to refer to singular or plural.

What is claimed is:

1. An antifouling resinous composition comprising one or more members selected from the group consisting of resins of the following formulae:

Formula (1)

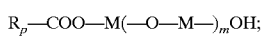

Formula (2)

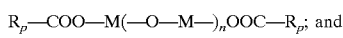

Formula (3)

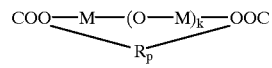

wherein $R_p$ represents a base resin, M represents at each occurrence the same or different divalent metallic atom, m represents an integer in the range of 1–10, n represents an integer in the range of 0–10, and k represents an integer in the range of 0–10.

2. A resinous composition according to claim 1, wherein said divalent metallic atom is at least one member selected from the group consisting of copper, zinc, calcium, magnesium, and iron.

3. A resinous composition according to claim 1, wherein said base resin comprises a vinyl polymer having an acid value in the range of about 30–300.

4. A resinous composition according to claim 2, wherein said base resin is a vinyl polymer having an acid value in the range of about 30–300.

5. A resinous composition according to claim 1, wherein the resin includes a mixture of formulae 1, 2 and 3 wherein m is 5.5, n is 0.8, and k is 0.9.

6. A resinous composition according to claim 1, wherein the resin is of formula 3 and k is 1.1.

7. A method for the production of an antifouling resinous composition having as an active component thereof one or more members selected from the group consisting of resins represented by the general formulas Formula (1)

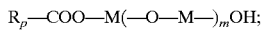

Formula (2)

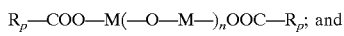

Formula (3)

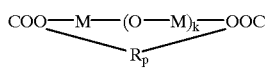

wherein $R_p$ represents a base resin, M represents a divalent metallic atom, m represents an integer in the range of 1–10, n represents an integer in the range of 0–10, and k represents an integer in the range of 0–10 and contains a metal carboxylate, said method comprising: reacting an the oxide or hydroxide of a divalent metal M with a resin having a carboxyl group in the presence of about 6–30% by weight of water based on the weight of the resin having a carboxyl group.

8. A method according to claim 7, wherein said divalent metallic atom is at least one member selected from the group consisting of copper, zinc, calcium, magnesium, and iron.

9. A method according to claim 7, wherein said base resin comprises a vinyl polymer having an acid value in the range of about 30–300.

10. A method according to claim 8, wherein said base resin comprises a vinyl polymer having an acid value in the range of about 30–300.

11. A method according to claim 7, wherein said oxide or hydroxide of a divalent metal is reacted with the resin at a temperature in the range of about 50–200° C.

12. A method according to claim 7, wherein said oxide or hydroxide of a divalent metal is reacted with the resin for a time period of about 1–20 hours.

13. A method according to claim 7, wherein the oxide or hydroxide of a divalent metal is reacted with the resin in the presence of a polar solvent.

14. A method according to claim 13, wherein the polar solvent is selected from the group consisting of n-butanol, isopropyl alcohol, methylethyl ketone, methylisobutyl ketone, ethyl ester, butyl acetate, isobutyl acetate, cellosolve, butyl cellosolve, diethylene glycol, diethylene glycol monoethyl ether, and diethylene glycol monobutyl ether.

15. A method for providing a antifouling paint composition comprising: mixing an antifouling resinous composition according to claim 1 with a paint thereby providing antifouling properties to a paint.

16. A resin represented by one of the following formulae:

Formula (1)

Formula (1)

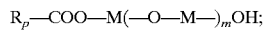

Formula (2)

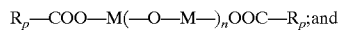

Formula (3)

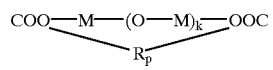

wherein $R_p$ represents a base resin, M represents a divalent metallic atom, m represents an integer in the range of 1–10, n represents an integer in the range of 0–10, and k represents an integer in the range of 0–10.

* * * * *